United States Patent
Brutt et al.

(10) Patent No.: US 12,345,682 B2
(45) Date of Patent: Jul. 1, 2025

(54) NON-DESTRUCTIVE TESTING OF A MECHANICAL PART MADE OF A POLYCRYSTALLINE MATERIAL

(71) Applicants: SAFRAN, Paris (FR); CENTRE NATIONAL DE LA RECHERCHE SCIENTIFIQUE, Paris (FR); ECOLE SUPERIEURE DE PHYSIQUE ET DE CHIMIE INDUSTRIELLE DE LA VILLE DE PARIS, Paris (FR)

(72) Inventors: Cecile Brutt, Moissy-Cramayel (FR); Benoit Gerardin, Moissy-Cramayel (FR); Alexandre Aubry, Paris (FR); Arnaud Derode, Paris (FR); Claire Prada, Paris (FR)

(73) Assignees: SAFRAN, Paris (FR); CENTRE NATIONAL DE LA RECHERCHE SCIENTIFIQUE, Paris (FR); ECOLE SUPERIEURE DE PHYSIQUE ET DE CHIMIE INDUSTRIELLE DE LA VILLE DE PARIS, Paris (FR)

( * ) Notice: Subject to any disclaimer, the term of this patent is extended or adjusted under 35 U.S.C. 154(b) by 301 days.

(21) Appl. No.: 17/995,296
(22) PCT Filed: Mar. 31, 2021
(86) PCT No.: PCT/FR2021/050563
§ 371 (c)(1),
(2) Date: Sep. 30, 2022
(87) PCT Pub. No.: WO2021/198614
PCT Pub. Date: Oct. 7, 2021

(65) Prior Publication Data
US 2023/0160854 A1 May 25, 2023

(30) Foreign Application Priority Data
Apr. 2, 2020 (FR) ..................... 20 03292

(51) Int. Cl.
*G01N 29/04* (2006.01)
*G01N 29/38* (2006.01)
(Continued)

(52) U.S. Cl.
CPC ........... *G01N 29/04* (2013.01); *G01N 29/043* (2013.01); *G01N 29/38* (2013.01); *G01N 29/44* (2013.01);
(Continued)

(58) Field of Classification Search
CPC ...... G01N 29/04; G01N 29/043; G01N 29/38; G01N 29/44; G01N 29/46;
(Continued)

(56) References Cited

U.S. PATENT DOCUMENTS 5,471,878 A 12/1995 Chiao et al.
6,387,197 B1 5/2002 Bewlay et al.
(Continued)

FOREIGN PATENT DOCUMENTS

CN 107688050 A * 2/2018
EP 2 182 351 A1 10/2009
(Continued)

OTHER PUBLICATIONS

WO-2018109314-A1, English (Year: 2018).*
(Continued)

*Primary Examiner* — Ryan D Walsh
(74) *Attorney, Agent, or Firm* — Oblon, McClelland, Maier & Neustadt, L.L.P.

(57) ABSTRACT

A device, for non-destructive testing of a mechanical part made of a polycrystalline material, includes: an ultrasonic probe including a two-dimensional array of transducers capable of emitting and receiving signals at different excitation angles; and a processing module suitable for controlling the emission and the reception of the transducers, for processing the signals received by the transducers so as to express the signals received by the ultrasonic probe in two planar wave planes constructed from the emission and reception wave vectors of the probe, and for deducing (Continued)

therefrom information representative of the three-dimensional orientation of the fiber structure of the mechanical part.

6 Claims, 4 Drawing Sheets

(51) Int. Cl.
*G01N 29/44* (2006.01)
*G01N 29/46* (2006.01)

(52) U.S. Cl.
CPC ..... *G01N 29/46* (2013.01); *G01N 2291/0231* (2013.01); *G01N 2291/0289* (2013.01); *G01N 2291/106* (2013.01)

(58) Field of Classification Search
CPC ... G01N 2291/0231; G01N 2291/0289; G01N 2291/106
See application file for complete search history.

(56) References Cited

U.S. PATENT DOCUMENTS

| | | |
|---|---|---|
| 2010/0121584 A1 | 5/2010 | Moreau et al. |
| 2012/0111116 A1 | 5/2012 | Minonzio et al. |
| 2016/0349218 A1* | 12/2016 | Robert .................. G01N 29/07 |
| 2021/0048413 A1* | 2/2021 | Chinta ................ G01N 29/069 |

FOREIGN PATENT DOCUMENTS

| | | | |
|---|---|---|---|
| WO | WO 2010/142927 A1 | 12/2010 | |
| WO | WO-2018109314 A1 * | 6/2018 | ............... A61B 8/14 |
| WO | WO 2018/138430 A1 | 8/2018 | |
| WO | WO-2020016250 A1 * | 1/2020 | ......... G01N 29/0654 |
| WO | WO-2020128285 A1 * | 6/2020 | ........... G01N 29/043 |

OTHER PUBLICATIONS

CN-107688050-A, English (Year: 2018).*
WO-2020016250-A1, English (Year: 2020).*
WO-2020128285-A1, English (Year: 2020).*
International Search Report issued Jul. 9, 2021 in PCT/FR2021/050563 filed Mar. 31, 2021 , citing documents 1-2, 15-16 & 25 therein, 2 pages.
French Preliminary Search Report Issued Nov. 11, 2020 in French Application 20 03292 filed on Apr. 2, 2020 (with English Translation of Categories of Cited Documents), citing documents 15-16 & 25 therein, 2 pages.
Nico F. Declercq, et al., "Simulations of harmonic and pulsed ultrasonic polar scans", NDT & E International, vol. 39, No. 3, 2006 pp. 205-216.

* cited by examiner

NON-DESTRUCTIVE TESTING OF A MECHANICAL PART MADE OF A POLYCRYSTALLINE MATERIAL

TECHNICAL FIELD

The present invention generally relates to the non-destructive testing of mechanical parts. It applies more particularly to mechanical parts made of polycrystalline material.

PRIOR ART

A number of critical parts used in aircraft engines are made of titanium alloys. These parts are forged from cylinders called "billets". They are optionally pre-machined or machined. Titanium, like certain alloys, is a polycrystalline material, that is to say it is made up of grains liable to deform during the various forging steps it undergoes. The shaping of the part causes deformations of its macrostructure and possible defects present in the part. A fibre structure plane corresponds to the map of the deformations undergone by the part during its shaping. The deformation of the grains at any point of the part can be predicted digitally by software, but the results are not completely reliable. Sometimes the actual fibre structure of the parts does not correspond to the theoretical fibre structure, for example due to errors during the manufacture of the billet or drifts during the forging of the part.

In order to ensure the integrity of these parts before assembly in the reactor and to test that they do not have any defects such as cracks, porosity or inclusions, these parts are tested non-destructively by ultrasound in order to detect any possible defect indications. These tests are carried out on the billets and on the parts formed after forging. They are carried out using one or more piezoelectric transducers. It is known to use a single-element piezoelectric probe or a (annular or linear) multi-element probe.

The ultrasonic tests of a part are designed assuming that the fibre structure plane of the part in question is known.

It is known that defect detection is optimal when the incident ultrasonic wave propagates in a direction perpendicular to the fibre structure, that is to say perpendicular to the preferred direction of elongation of the grains which constitute the polycrystalline material of the part. The directions of acoustic shots are therefore determined from the assumed fibre structure plane: this is an important element taken into account for the design of the test plane. Determining the fibre structure of the part is therefore essential to ensure optimum reliability and safety.

However, as already seen, it is possible that the actual fibre structure of the parts does not correspond to the theoretical fibre structure used for the design of the test. This is a problem because the test carried out is not adapted to the part, which can harm the detection of a defect in the most extreme case.

Moreover, knowledge of the fibre structure also provides information on the mechanical strength of the part.

WO 2018/138430 presents an ultrasonic test of a part to determine a direction of elongation of an elongated microstructure located in a part. For this purpose, a linear transducer is moved in translation and in rotation by movement means comprising for example a robotic arm or a movable support. Mathematical processing in real space is performed on the measurement results.

U.S. Pat. No. 6,387,197 relates to a method for treating titanium to form titanium articles which have reduced generated ultrasonic noise during ultrasonic inspection.

Coarse-grained materials are often difficult to assess ultrasonically. Difficulties arise because sound waves, which are used for ultrasonic inspection, can be partially reflected from grains and represent a "structural noise", or grain noise. The structural noise generated can hide the defects in the material and is therefore undesirable.

U.S. Pat. No. 5,471,878 relates to a method for suppressing grain noise during ultrasonic inspection of an object, and thereby allowing a high probability of defect detection and a low probability of false defect indications.

WO 2010/142927 discloses an ultrasonic method and device for characterising a medium. In particular, it involves non-destructively detecting the state of a mechanical part, for example a human or animal bone. This device uses a one-dimensional probe whose transducers are not capable of emitting and receiving signals at different excitation angles. "Trajectories", defined as lines of high energy which each reflect a vibratory mode and which form an assembly characteristic of the propagation medium, are determined. They correspond to the energy maxima in the frequency-propagation speed reference frame. These trajectories therefore have nothing to do with a three-dimensional orientation of the fibre structure of the mechanical part.

There is no effective industrial non-destructive method to determine the fibre structure orientation of parts made of polycrystalline materials.

DESCRIPTION OF THE INVENTION

The invention aims at solving the problems of the prior art by providing a non-destructive testing device for a mechanical part made of a polycrystalline material, including
   an ultrasonic probe including a two-dimensional array of transducers capable of emitting and receiving signals at different excitation angles, and
   a processing module adapted to control the transducers in emission and in reception, process the signals received by the transducers so as to express the signals received by the transducers in two planes of plane-waves constructed from emission and reception wave vectors of the probe, and to deduce therefrom information representative of the three-dimensional orientation of the fibre structure of the mechanical part.

Thanks to the invention, it is possible to shoot ultrasonic beams with different angles without rotating the probe. Thus, in a single acquisition and without user intervention, it is possible to acquire a set of ultrasound signals sufficient for the appropriate treatment. Then, the processing allows to construct virtual wave vectors allowing to deduce information on the local and three-dimensional orientation of the fibre structure.

The invention allows to obtain greater robustness of the measurement while being compatible with industrial systems.

According to a preferred feature, the processing module is adapted to construct a three-dimensional reflection matrix.

According to a preferred feature, the processing module is adapted to express the signals received by the transducers in a plane-wave base.

According to a preferred feature, the processing module is adapted to construct the two planes of plane-waves by summation and difference of the wave vectors associated respectively with the plane-waves emitted and received by the probe.

According to a preferred feature, the processing module is adapted to deduce the information representative of the three-dimensional orientation of the fibre structure of the mechanical part by determining a direction associated with intensity maxima of the received signals expressed in the two planes of plane-waves constructed from the emission and reception wave vectors of the probe.

The invention also relates to a method for non-destructively testing a mechanical part made of a polycrystalline material, implemented in the device presented above, characterised in that it includes steps of controlling the transducers in emission and in reception, of processing the signals received by the transducers, of expressing the signals received by the transducers in two planes of plane-waves constructed from emission and reception wave vectors of the probe, and of deducing information representative of the three-dimensional orientation of the fibre structure of the mechanical part.

The method has advantages similar to those previously presented.

In a particular embodiment, the steps of the method according to the invention are implemented by computer program instructions.

Consequently, the invention also relates to a computer program on an information medium, this program being capable of being implemented in a computer, this program including instructions adapted to the implementation of the steps of a method as described above.

This program may use any programming language, and be in the form of source code, object code, or intermediate code between source code and object code, such as in partially compiled form, or in any other desirable form.

The invention also relates to an information medium readable by a computer, and including computer program instructions adapted to the implementation of the steps of a method as described above.

The information medium can be any entity or device capable of storing the program. For example, the medium may include a storage medium, such as a ROM, for example a CD ROM or a microelectronic circuit ROM, or else a magnetic recording medium, for example a floppy disk or a hard disk.

On the other hand, the information medium can be a transmissible medium such as an electrical or optical signal, which can be conveyed via an electrical or optical cable, by radio or by other means. The program according to the invention can in particular be downloaded from an Internet-type network.

Alternatively, the information medium may be an integrated circuit wherein the program is incorporated, the circuit being adapted to execute or to be used in the execution of the method according to the invention.

BRIEF DESCRIPTION OF THE DRAWINGS

Other features and advantages will appear upon reading the following description of a preferred embodiment, given by way of non-limiting example, described with reference to the figures wherein.

Identical, similar or equivalent portions of the different figures bear the same reference numerals so as to facilitate passage from one figure to another.

The different portions shown in the figures are not necessarily shown on a uniform scale, to make the figures more readable.

The different possibilities (variants and embodiments) must be understood as not mutually exclusive and can be combined with each other.

DETAILED DESCRIPTION OF PARTICULAR EMBODIMENTS

Figure 1:
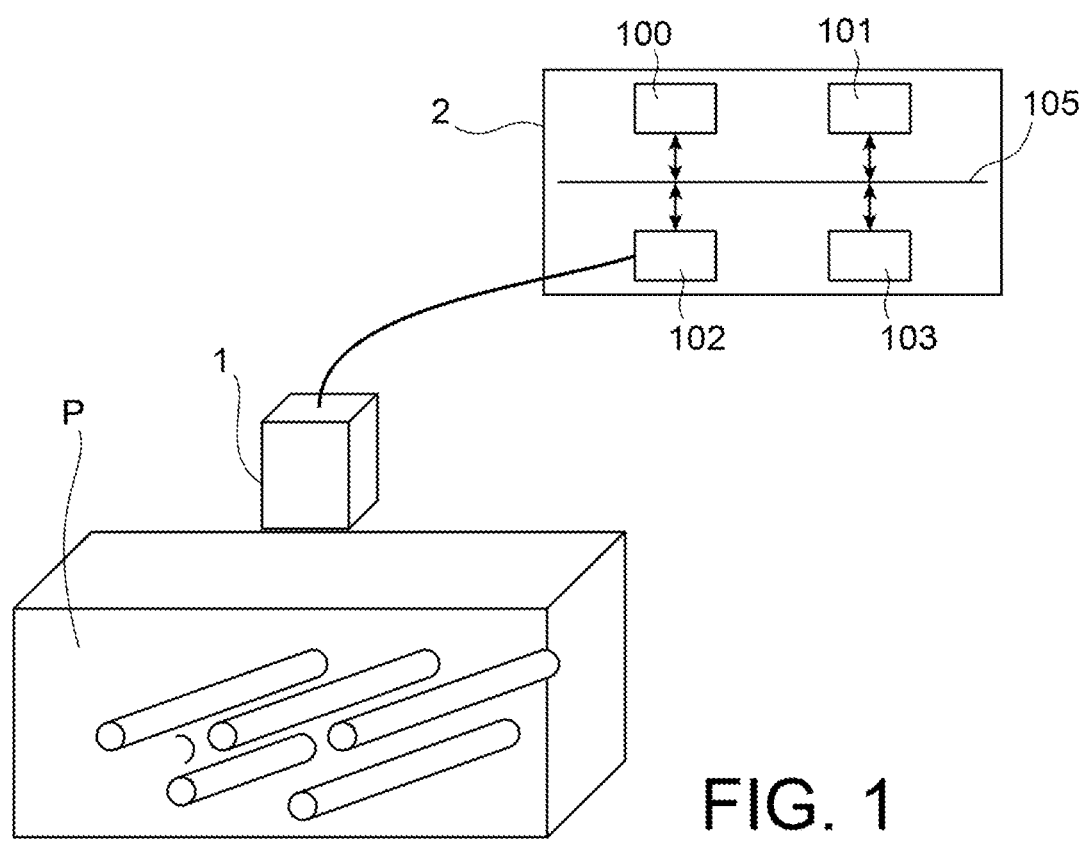
FIG. 1 illustrates the non-destructive testing device when testing the mechanical part, according to one embodiment of the invention.

FIG. 1 shows a mechanical part P made of polycrystalline material, for example titanium. The part P is forged and optionally pre-machined and/or machined. The part P includes an internal fibre structure, shown schematically by cylinders.

The part P must be tested in a non-destructive way to verify that it does not have any defect, such as for example crack, porosity or inclusion. This test can be carried out using ultrasonic techniques. For this purpose, the user needs to know the fibre structure direction of the part, that is to say the preferred local direction of elongation of the grains of the material. Indeed, it is known that defect detection is optimal when the incident ultrasonic wave propagates in a direction perpendicular to the fibre structure.

The non-destructive testing device which will be described allows to determine the direction of the fibre structure of the part P.

According to a preferred embodiment shown in FIG. 1, the device for non-destructive testing of a mechanical part made of polycrystalline material includes an ultrasound probe 1 which includes a two-dimensional network of transducers capable of emitting and receiving signals according to different propagation angles.

Figure 2:
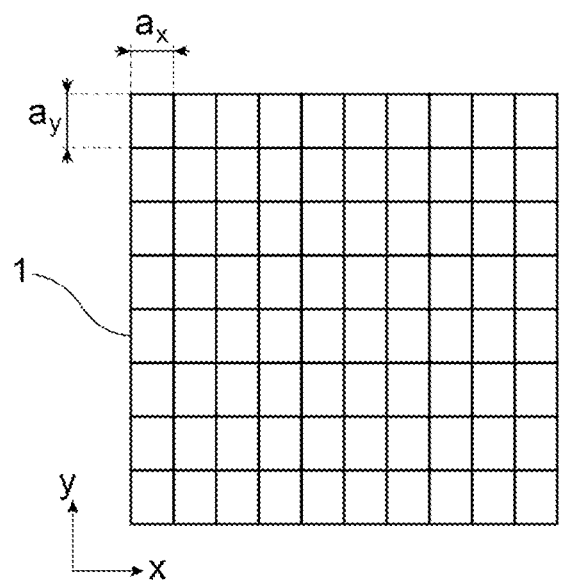
FIG. 2 illustrates a bottom view of the ultrasonic probe implemented in the device of FIG. 1, according to one embodiment of the invention.

FIG. 2 shows a bottom view of the ultrasonic probe 1. The transducers are rectangular, of sizes $a_x$ and $a_y$ along two dimensions defined by two orthogonal axes X and Y and are distributed along the axes X and Y. The transducers are independent of the each other and can be tested in emission and in reception. It should be noted that other transducer geometries are possible and that their disposition can be regular or random.

The non-destructive testing device also includes a processing module 2 connected to the ultrasonic probe 1. The processing module 2 is adapted to test the transducers in emission and in reception and to process the signals received by the transducers as described below.

The processing module 2 is implemented as a computer. The computer 5 includes in particular a processor 100, a memory 101, an input interface 102 and an output interface 103.

These different elements are conventionally connected by a bus 105.

The processor 100 executes a computer program implementing the method according to the invention. These processing operations are carried out in the form of computer program code instructions which are stored by the memory 101 before being executed by the processor 100.

The output interface 103 is connected to the probe 1 and delivers the data which represent control instructions for the transducers of the probe 1.

The input interface 102 is connected to the probe 1 and is intended to receive data representing the signals received by the transducers.

Two configurations for testing the part are possible:
in the first one, the probe is positioned directly on the part to be inspected (configuration known as "in contact"), the ultrasonic transmission then being ensured by a coupling gel or water;
in the second one, the inspected part and the probe are immersed in water, the probe is positioned facing the part, the correct ultrasonic transmission then being ensured by the water.

Figure 3:
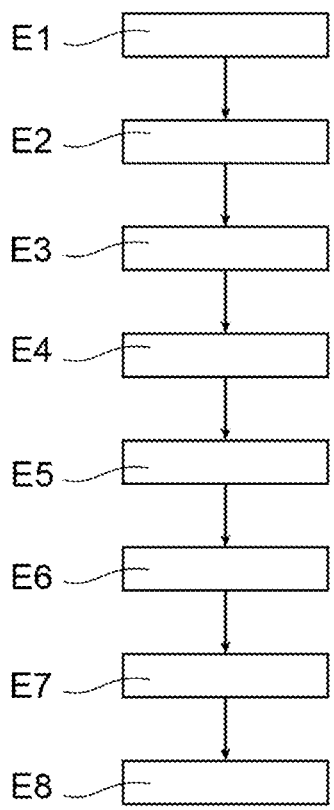
FIG. 3 illustrates the method for non-destructively testing the mechanical part, according to one embodiment of the invention.

The non-destructive testing method of FIG. 3 shows an embodiment of the operation of the non-destructive testing device of FIG. 1. The method includes steps E1 to E8.

It is assumed that the part P has been disposed in such a way as to be tested.

Step E1 is an ultrasonic signal emission control by the probe 1. For this purpose, all or part of the probe is used to emit a series of signals in real space related to the plane of the probe. The emission is for example carried out transducer by transducer. Each elementary shot of a transducer emits a circular wave. It takes all the elementary shots, that is to say one per transducer, to acquire a matrix called "real space" matrix.

Ultrasonic signal emission can also be carried out in other spaces if the signal-to-noise ratio is insufficient, for example a series of plane-waves of defined wave vectors $k_{in}$, intended to probe different angles. In this case, all the transducers being used, the total radiated energy is therefore higher.

A plane-wave shot uses all the transducers and sends a plane-wave at a precise and defined angle. It will take a set of shot sequences corresponding to each of the angles of a reflection matrix to acquire the latter, directly in the plane-wave space.

The next step E2 is the reception of the ultrasonic signal by the probe 1.

As for the emission, different possibilities exist in reception. A first possibility is to apply delay laws to the ultrasonic signals received in order to express them in a plane-wave base. In this case, the reception of ultrasonic signals is carried out in a plane-wave base.

Another possibility is to perform reception in real space. In this case, as explained below, a double spatial Fourier transform will be applied to the ultrasonic signals received in order to perform a base change to return to a plane-wave base.

In the next step E3, all the signals received by the probe 1 are rearranged into a reflection matrix K in order to be able to perform advanced signal processing on these signals.

Step E3 is the construction of the reflection matrix K, including the signals received by the probe 1, expressed in one base among the following:
a. Canonical base or elementary base: the elements of the probe pull or receive the backscattered signal one by one, independently.
b. Plane-wave base: the elements of the probe pull or receive the backscattered signal with a certain delay in order to create a plane-wave of chosen direction of propagation $k_{in}$.
c. A combination of these two bases in emission and in reception.

The reflection matrix K is composed of 3 dimensions: the base chosen in emission, the base chosen in reception and time.

The base chosen in emission is the canonical base $u_{in}$ or the plane-wave base $k_{in}$. The base chosen in reception is the canonical base $u_{out}$ or the plane-wave base $k_{out}$.

The probe 1 being a matrix (2D), each dimension $u_{in}$, $u_{out}$, $k_{in}$, $k_{out}$ is a vector of two components with indices x and y.

Figure 4:
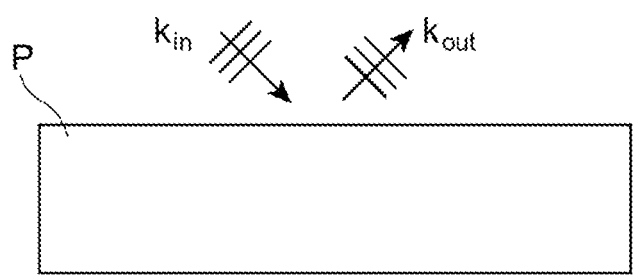
FIG. 4 is a schematic representation of the wave vectors associated with the plane-waves emitted and received by the ultrasonic probe, according to one embodiment of the invention.

FIG. 4 illustrates the wave vectors $k_{in}$ and $k_{out}$ associated respectively with the plane-waves emitted and received by the probe 1.

The next step E4 is the application of a time Fourier transform to each of the elementary signals acquired, in order to express them in the frequency space according to the last dimension of the reflection matrix K. It is recalled that the reflection matrix K includes two spatial dimensions and one time dimension.

The result of step E4 is a reflection matrix Kf, whose third dimension is frequency.

It is possible to consider a single frequency, the nominal frequency of the transducers for example. This limits the calculation time.

It is also possible to consider a bandwidth, for example the bandwidth of the transducers, then to average the signal over the bandwidth considered in order to improve the signal/noise ratio.

In all cases, the calculation is carried out frequency by frequency.

The next step E5 is the determination whether the emission or the reception of the ultrasonic signal has been carried out in the canonical base or whether the emission and the reception of the ultrasonic signal have been carried out in the canonical base. When this is the case, a spatial Fourier transform is applied to the received signals, on the relevant dimension(s) of the reflection matrix in order to express the received signals in a plane-wave base.

The transition matrix from the canonical base to the plane-wave base is the following: $P(u,k)=\exp(\pm i\, k.u)$, the sign depending on the convention chosen for the Fourier transform, u representing the canonical base, k representing the plane-wave base and "." representing the scalar product.

If the emission and the reception were carried out in a plane-wave base, the reflection matrix is unchanged by this step.

The reflection matrix then has 3 dimensions: the plane-wave base in emission $k_{in}=(k_{x,in}, k_{y,in})$, the plane-wave base in reception $k_{out}=(k_{x,out}, k_{y,out})$ and the considered frequency or frequencies f.

In the next step E6, two virtual matrices are constructed by summation and difference of the wave vectors $k_{out}$ and $k_{in}$ of the probe:

K1 ($k_{x,in}+k_{x,out}$; $k_{y,in}+k_{y,out}$; $k_{x,in}$; $k_{y,in}$; f), and
K2 ($k_{x,out}-k_{x,in}$; $k_{y,out}-k_{y,in}$; $k_{x,in}$; $k_{y,in}$; f).

From a physical point of view, these two matrices contain information on the local fibre structure direction.

In the next step E7, the matrices K1 and K2 are averaged according to the third, fourth and fifth dimensions $k_{x,in}$, $k_{y,in}$, and frequency. This operation consists in calculating an average of the elements of the matrix, by varying their indices of the third, fourth and fifth dimensions, the indices of the other dimensions remaining constant.

It should be noted that for the frequency dimension, the average calculation is only performed if a bandwidth is considered. In this case, the information is averaged over the bandwidth. If only one frequency is considered, there is no calculation of the average according to the frequency dimension.

This step results in two two-dimensional matrices: $K1_m$ ($k_{x,in}+k_{x,out}$; $k_{y,in}+k_{y,out}$) and $K2_m(k_{x,out}-k_{x,in}$; $k_{y,out}-k_{y,in})$.

The signal backscattered by the part P is expressed in the planes of the plane-waves "$k_{out}+k_{in}$" and "$k_{out}-k_{in}$" constructed from the wave vectors $k_{in}$ and $k_{out}$ of the probe. These planes of the plane-waves "$k_{out}+k_{in}$" and "$k_{out}-k_{in}$" carry usable information to determine the direction of the fibre structure.

In the next step E8, the matrices $K1_m$ and $K2_m$ are analysed to deduce the fibre structure directions in 3D.

Step E8 is the determination of the orientation of the fibre structure at each point considered according to the direction associated with the intensity maxima of the signal contained in the matrices $K1_m$ and $K2_m$.

The points of maximum intensity are the points of greatest values in the matrices $K1_m$ and $K2_m$. When the part has an anisotropic fibre structure, the points of maximum intensity follow preferred directions which provide information on the direction of the fibre structure.

The invention claimed is:

1. A device for non-destructive testing of a mechanical part made of a polycrystalline material, comprising:
   an ultrasonic probe including a two-dimensional array of transducers capable of emitting and receiving signals at different excitation angles, and
   a processor configured to
      test the transducers in emission and in reception,
      process the signals received by the transducers so as to express the signals received by the transducers in two planes of plane-waves constructed from emission and reception wave vectors of the probe by summation and difference of the wave vectors associated respectively with the plane-waves emitted and received by the probe, and
      deduce information representative of a three-dimensional orientation of a fiber structure of the mechanical part.

2. The device for non-destructive testing of a mechanical part made of a polycrystalline material according to claim 1, wherein the processor is configured to construct a three-dimensional reflection matrix.

3. The device for non-destructive testing of a mechanical part made of a polycrystalline material according to claim 1, wherein the processor is configured to express the signals received by the transducers in a plane-wave base.

4. The device for non-destructive testing of a mechanical part made of a polycrystalline material according to claim 1, wherein the processor is configured to deduce the information representative of the three-dimensional orientation of the fiber structure of the mechanical part by determining a direction associated with intensity maxima of the received signals expressed in the two planes of plane-waves constructed from the emission and reception wave vectors of the probe.

5. A method for non-destructively testing a mechanical part made of a polycrystalline material, implemented in the device according to claim 1, comprising:
   controlling the transducers in emission and in reception,
   processing the signals received by the transducers,
   expressing the signals received by the transducers in two planes of plane-waves constructed from emission and reception wave vectors of the probe by summation and difference of the wave vectors associated respectively with the plane-waves emitted and received by the probe, and
   deducing information representative of a three-dimensional orientation of a fiber structure of the mechanical part.

6. A non-transitory computer-readable recording medium on which is recorded a computer program comprising instructions for execution, by a computer, of the method according to claim 5.

* * * * *